July 26, 1960 W. A. REICH 2,946,407
HAND TRUCK HAVING POWER ACTUATED ARTICLE RECEIVING BODY
Filed April 28, 1958 2 Sheets-Sheet 1
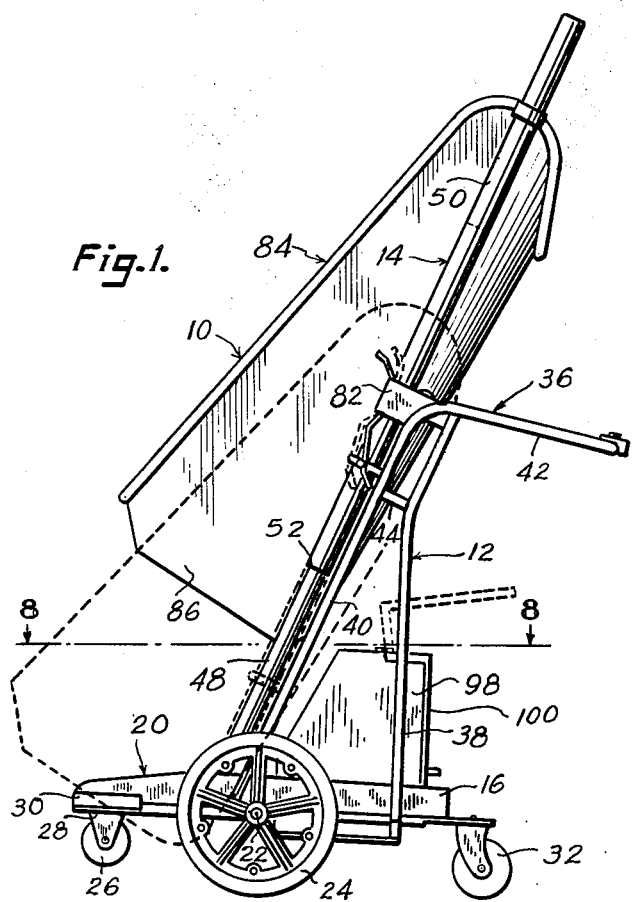
Fig.1.
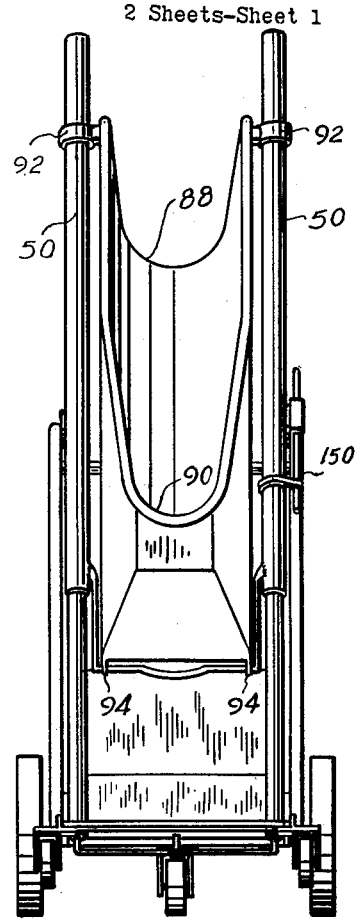
Fig. 2.
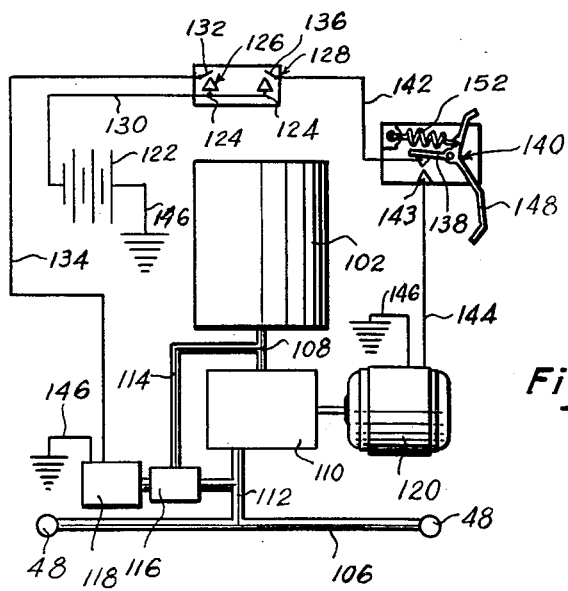
Fig. 3.
INVENTOR.
Walter A. Reich
BY 
ATTORNEY July 26, 1960
W. A. REICH
2,946,407
HAND TRUCK HAVING POWER ACTUATED ARTICLE RECEIVING BODY
Filed April 28, 1958
2 Sheets-Sheet 2
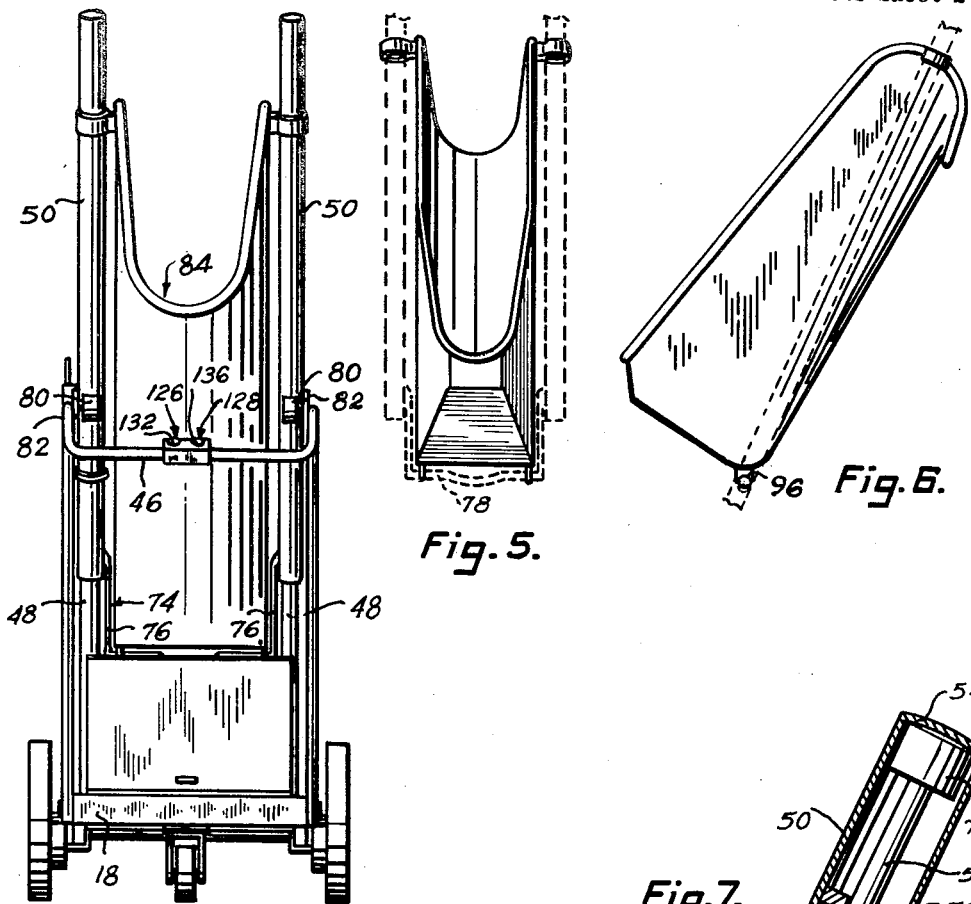
Fig. 4.
Fig. 5.
Fig. 6.
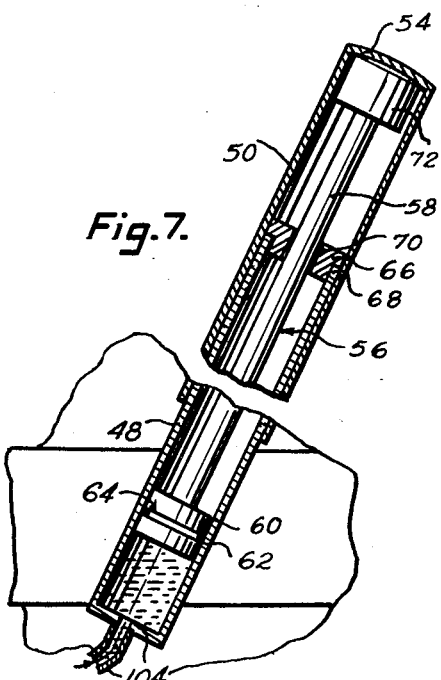
Fig. 7.
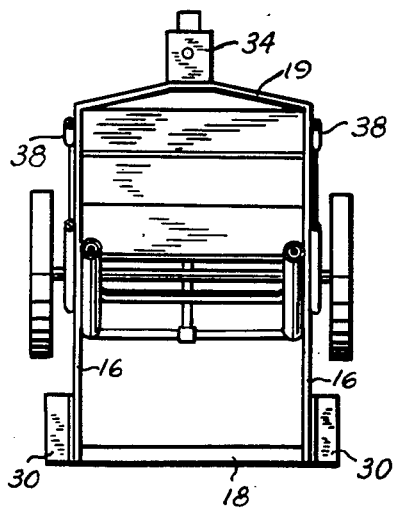
Fig. 8.
INVENTOR.
Walter A. Reich
BY
ATTORNEY United States Patent Office 2,946,407
Patented July 26, 1960

2,946,407

HAND TRUCK HAVING POWER ACTUATED ARTICLE RECEIVING BODY

Walter A. Reich, Kansas City, Mo., assignor to A. Reich & Sons, Inc., Kansas City, Mo., a corporation of Missouri Filed Apr. 28, 1958, Ser. No. 731,515

4 Claims. (Cl. 187—10)

This invention relates to improvements in material handling equipment and more particularly, to a hand truck having novel structure thereon for transporting an article such as a side of beef from one point to another, and having means thereon for lifting such article to a desired height without manual handling of the same being necessary.

It is, of course, well known that the handling of sides of beef or other meats has been a laborious and relatively dangerous process because of the fact that the sides are extremely heavy, unwieldy and must be removed from and placed on various types of hooks for storage and/or transportation purposes. Heretofore, it has been common practice for the laborer to stand on an elevated platform to remove the beef side from a hook either in the warehouse or in a car or the like, and then subsequently carry the side on his shoulder to a desired point whereupon it was again necessary to mount an elevated structure in order to hook the leg of the beef side over suitable support means. Prior attempts to provide hand carts for transporting the beef sides from one point to another have not been entirely satisfactory because it was still necessary for the operator of the truck to manually remove the beef side from the elevated hook and then subsequently place the side on another hook by hand. Although certain types of lift carts have been previously disclosed showing means for raising the beef sides to the level of the hook, these carts have not been entirely satisfactory because of the fact that they were too expensive, complicated and unwieldy or required a considerable period of time to raise the leg of the beef side to the desired height to make the use of such carts impractical.

It is, therefore, the most important object of this invention to provide a hand truck particularly adapted for transporting articles in the nature of sides of beef or the like which includes selectively actuatable mechanism for elevating the side of beef to a desired height in order that the same may be readily placed over or removed from a suitable hook.

An equally important object of the instant invention is to provide a hand truck as described, wherein the mechanism for elevating the side of beef to the desired height is constructed in a manner to quickly raise the beef side to the desired level in a minimum period of time, and also constructed so that the frame supporting the side may also be lowered to its normally lowermost position in a short period to thereby make utilization of the hand truck commercially practical from a time standpoint.

A further important object of this invention is to provide a hand truck including a normally upright, primary, mobile frame and a secondary frame reciprocably mounted on the primary frame and adapted to receive the side of beef to be transported, as well as hydraulically operated mechanism connected to the article-supporting secondary frame for quickly and efficiently raising the secondary frame and thereby, the side of beef to a desired level where the beef side may be engaged with a suitable hook.

Also an important object of the present invention is to provide a hand truck as referred to above wherein the frames are provided with telescoped, relatively shiftable tubular members with the hydraulic mechanism connected to such members, to the end that upon direction of liquid under pressure into the lower tubular member, a respective upper tubular member is reciprocated to thereby move the secondary frame and the side of beef carried by the same upwardly to a desired elevation in a relatively short period of time and with no manual effort on the part of the operator being necessary.

Other important objects of this invention relate to the provision of a hand truck wherein the hydraulic mechanism includes a liquid reservoir, a pump for the liquid and a prime mover for operating the pump which is operably coupled with a battery, all carried by the lower primary mobile frame of the truck, to the end that the upper, load-bearing, secondary frame shiftably mounted on the primary frame may be moved substantially vertically without any manual effort on the part of the operator being necessary; to the provision of solenoid actuated valve means associated with the hydraulic mechanism for permitting return flow of liquid from the tubular members to be selectively controlled so that downward movement of the upper, load-bearing frame is effected by gravitational action upon opening of the valve and deenergization of the motor operably coupled with the liquid pump; to the provision of switch means interposed in the conduit connecting the pump prime mover with the battery and disposed to be engaged by suitable stop means on the secondary, upper, load-bearing frame to the end that the upward movement of the secondary frame is interrupted when the secondary frame reaches a predetermined elevation; to the provision of a novel receptacle for receiving the side of beef and which is substantially J-shaped in transverse cross-section from front to rear, to thereby assure that the side of beef is properly maintained on the truck during use of the same and may be quickly and easily removed from such receptacle; to the provision of novel structure for removably mounting the receptacle on the upper, secondary frame so that such receptacle may be easily cleaned and replaced if desired; and to other important objects and salient features of the instant invention which will become obvious or be explained more fully as the following specification progresses.

In the drawing:

Figure 1 is a side elevational view of a hand truck particularly adapted for transporting sides of beef and showing the normally uppermost position of the beef side receiving receptacle in full lines, while the normally lowermost location of such receptacle is indicated by dotted lines;

Fig. 2 is a front elevational view of the hand truck described above and likewise showing the beef side receptacle in its uppermost position;

Fig. 3 is a schematic diagram illustrating the electrical and hydraulic components of the present hand truck for raising and lowering the beef side receptacle;

Fig. 4 is a rear elevational view similar to the view shown in Fig. 2;

Fig. 5 is a fragmentary, front elevational view of the beef side receiving receptacle per se and showing the relative disposition of the parts normally supporting the same in dotted lines;

Fig. 6 is a side elevational view of such receptacle and also showing the supporting components of the hand truck in dotted lines;

Fig. 7 is an enlarged, fragmentary, vertical, cross-sectional view illustrating the telescoped tubular members for raising and lowering the upper secondary frame with respect to the lower primary frame; and Fig. 8 is a horizontal, cross-sectional view taken substantially on the line 8—8 of Fig. 1 and looking downwardly in the direction of the arrows.

Briefly, the present hand truck includes a primary, lower, mobile frame having suitable handle means thereon, as well as an upper sceondary frame mounted on the primary frame for vertical reciprocation and including means for supporting a receptacle adapted to receive a side of beef or the like. Selectively actuatable hydraulic mechanism is carried by the primary frame and is operably coupled with both of the frames for shifting the secondary frame having the beef receiving receptacle thereon relative to the lower, mobile, primary frame upon actuation of the mechanism. The hydraulic mechanism is constructed so that the upper beef side supporting frame may be raised and lowered without any manual effort on the operator's part being necessary.

A hand truck constructed in accordance with the preferred concepts of the instant invention is designated in the drawings generally by the numeral 10 and includes a primary, mobile frame broadly numerated 12, as well as an upper, article-supporting, secondary frame 14 reciprocably mounted on frame 12 for vertical shifting movement when disposed in an upright position.

Frame 12 includes a pair of elongated, parallel, horizontal, spaced, main structural elements 16 interconnected at opposed terminal ends thereof by cross elements 18 and 19 to present a polygonal, lower base 20. A horizontal axle 22 is carried by and spans the distance between main elements 16 intermediate the ends thereof, as clearly shown in Fig. 1, and relatively large wheels 24 are rotatably mounted on axle 22 on corresponding ends thereof extending outwardly from the outer faces of elements 16.

Relatively small wheels 26 are rotatably carried by U-shaped brackets 28 secured to L-shaped plates 30 mounted on the ends of elements 16 interconnected by cross element 18 and, as shown in Fig. 8, brackets 28 are joined to opposed outer faces of elements 16 by welding or the like. Additional mobile support means on primary frame 12 includes a caster wheel 32 rotatably mounted on normally horizontal, rectangular mounting plate 34 secured to the outer face of cross element 19 as shown in Fig. 8.

Handle structure broadly designated 36 is provided on base 20 and includes a pair of substantially upright standards 38 joined to the outermost faces of respective elements 16, as well as a pair of angularly disposed uprights 40 secured to the outermost surfaces of elements 16 substantially intermediate the ends of the same. A substantially U-shaped, relatively horizontal handle 42 extends outwardly from uppermost corresponding ends of uprights 40 and is integral with the latter. In this connection, it is to be pointed out that handle 42 and uprights 40 may be constructed of a single length of tubular material and bent into the desired configuration. As illustrated in Fig. 1, the uppermost ends of standards 38 are joined to respective legs of handle 42, and brace means 44 is provided between corresponding standards 38 and uprights 40 for reenforcing handle structure 36. Handle 42 has an integral, horizontal bight 46 disposed in a position to permit the operator of hand truck 10 to push the same with a minimum amount of effort.

A pair of elongated, parallel, tubular members 48 are welded to the inner, opposed faces of element 16 intermediate the ends of the latter and adjacent the points of connection of uprights 40 to elements 16, and members 48 extend upwardly from base 20 at an angle with respect to the latter in a direction toward rear cross element 19 and in substantial parallelism with uprights 40.

Secondary frame 14 is reciprocably mounted on primary frame 12 and in this connection, is provided with a pair of elongated, tubular members 50. The lowermost ends 52 of members 50 are open and members 50 are disposed in telescoped, relatively shiftable relationship over corresponding tubular members 48, as clearly shown in Fig. 7. The uppermost ends of tubular members 50 are closed by respective plates 54, and an elongated element broadly designated 56 is positioned within each pair of telescoped members 50 and 52.

Each element 56 includes an elongated rod 58 of substantially smaller diameter than tubular members 48 and 50, and a piston head 60 is secured to the normally lowermost end of each rod 58 within corresponding tubular members 48, and has an outer, cylindrical surface substantially equal in diameter to the inner surface of respective members 48. An O-ring 62 positioned within circumferentially extending groove 64 in each of the piston heads 60 provides a tight seal between heads 60 and respective inner, cylindrical surfaces of tubular members 48. A plug 66 frictionally positioned within the uppermost open end 68 of each of the tubular members 48 has a perforation 70 therein substantially equal in diameter to that of corresponding rods 58, whereby plugs 66 slidably receive the same.

Enlarged thrust components 72 are attached to the uppermost end of each of the rods 58 and engage the innermost surfaces of respective plates 54 on tubular members 50. It can be appreciated that elements 56 are freely reciprocable within corresponding tubular members 48 and 50.

A substantially U-shaped supporting frame broadly numerated 74 is secured to members 50 and includes a pair of elongated, parallel, normally upright legs 76 joined to the lower ends of members 50 as by welding or the like, and a crossbar 78 interconnecting the lowermost ends of legs 76. As illustrated in Fig. 1 by dotted lines, crossbar 78 is located somewhat below the level of axle 22 when frame 14 is disposed at the lowermost end of its path of travel.

In order to facilitate reciprocation of frame 14 with respect to frame 12, a pair of rollers 80 are rotatably mounted on polygonal, vertical bracket plates 82 secured to the innermost surfaces of handle structure 36 adjacent the zone of merger of handle 42 with uprights 40. Rollers 80 are disposed for rotation on horizontal axes and are positioned to rotatably receive tubular members 50 of frame 14.

A receptacle adapted to receive articles in the nature of sides of beef is broadly numerated 84 and is removably positioned on frame 14 in a manner to be described. Receptacle 84 includes an open top, hollow pan 86 formed of sheet metal or the like and is substantially J-shaped in transverse cross-section from front to rear, as clearly indicated in Figs. 1 and 6. The upper rear margin 88 and the lower front margin 90 of pan 86 defining the open top thereof are concave in configuration, as shown in Figs. 2 and 5, and thus facilitate placement of sides of beef or similar articles in receptacle 84 and also, upper concave margin 88 serves to clear the upper leg portion of the beef side and permit the hook element to be placed in or removed from the side of beef.

Means on receptacle 84 removably mounting the same on frame 14 includes a pair of identical, oppositely extending collars 92 attached to opposed outermost faces of pan 86 adjacent corresponding upper edges thereof and are positioned to be slidably disposed over respective tubular members 50. A pair of horizontally spaced mounting plates or blocks 94 are secured to the normally lowermost edge portion of pan 86 and each block 94 is provided with a downwardly facing, concave edge 96 engageable with crossbar 78, as shown in Figs. 5 and 6. It can thus be seen that pan 86 rests on crossbar 78 while mounting blocks 94 prevent lateral movement of the lowermost end of receptacle 84 with respect to base 20. By the same token, collars 92 slidably disposed over tubular members 50 serve to maintain receptacle 84 in proper disposition on frame 14.

Hydraulic mechanism for raising and lowering frame 14 with respect to frame 12 is mounted on base 20 within a housing 98 provided with a swingable access door 100 and, as schematically illustrated in Fig. 3, the hydraulic mechanism includes a liquid reservoir 102 adapted to contain a suitable amount of hydraulic fluid or liquid which communicates with the lowermost closed ends 104 of respective lower tubular members 48. A lateral 106 intercommunicates reservoir 102 with members 48 by a branch 108 passing into the inlet of a pump 110 as well as a branch 112 coupled with the outlet of pump 110 and connected to lateral 106. A by-pass line 114 connected to branches 108 and 112 on opposite sides of pump 110 has a valve 116 interposed therein for controlling return flow of fluid from tubular members 48 to reservoir 102. A solenoid 118 operably coupled with valve 116 controls opening and closing of the same in a manner to be more fully described hereinafter.

An electric motor 120 is coupled with pump 110 for operating the same and means for electrically energizing motor 120 and solenoid 118 preferably comprises a battery 122 carried by base 20 within housing 98. Battery 122 is connected to the contact posts 124 of a pair of switches 126 and 128 by a lead 130, while solenoid 118 is electrically coupled with the normally open switch arm 132 of switch 126 by a lead 134. The normally open switch arm 136 of switch 128 is connected to the normally closed switch arm 138 of a switch broadly numerated 140 by a conduit 142, while motor 120 is coupled with the contact 143 of switch 140 by a lead line 144. Solenoid 118, motor 120 and battery 122 are grounded to frame 20 by suitable leads 146.

Switch 140 is positioned on one of the plates 82 with the irregularly shaped arm 148 thereof attached to switch arm 138 disposed to be engaged by a stop arm 150 attached to a corresponding adjacent tubular member 50. It is to be noted that arm 148 of switch 140 is configured so that upon engagement of the same by stop arm 150, switch arm 138 is moved out of engagement with contact 143 to break the circuit from battery 122 to motor 120.

Hand truck 10 is constructed for not only transporting sides of beef or the like from one point to another but also is adapted to raise or lower the beef sides in order to facilitate removal and placement of the meat on overhead hooks in a storage place. In this connection, it is to be pointed out that if a side of beef is hanging from a suitable hook and it is desired to remove the same for movement to another location, the operator of truck 10 depresses button or switch arm 136 of switch 128 on bight 46 of handle structure 36 to energize motor 120 through a circuit from battery 122 traced by lead 130 through contact posts 124, switch arm 136, conduit 142, normally closed switch arm 138, contact 143 and lead line 144 connected to motor 120. As heretofore indicated, battery 122 and motor 120 are grounded to base 20 by leads 146. Inasmuch as motor 120 is operably coupled with pump 110, the latter is rotated so long as the operator maintains switch arm 136 in engagement with contact posts 124. Upon rotation of pump 110 by motor 120, pump 110 draws liquid from reservoir 102 through branch 108 and directs such liquid under pressure to the lowermost ends of tubular members 48 through branch 112 and respective laterals 106.

As the liquid under pressure passes into the lower ends of tubular members 48, such liquid acting on piston heads 60 forces elements 56 upwardly within corresponding tubular members 48 and 60 to cause members 50 to be shifted upwardly with respect to members 48. During upward movement of elements 56, thrust components 72 on the uppermost ends thereof bear against respective plates 54 and thus cause frame 14 to be moved upwardly with respect to frame 12.

During upward reciprocation of frame 14, the operator adjusts the position of hand truck 12 so that the side of beef is received within pan 86 of receptacle 84. Inasmuch as the side of beef is hanging from a hook or the like, the larger portion of such side will be disposed in the lower enlarged part of pan 86 while the leg thereof extends upwardly between the sides of receptacle 84 parallel with tubular members 50. The concave front margin 90 of pan 86 serves to clear the side of beef during upward movement of frame 14 into a position with receptacle 84 receiving the beef side, while concave rear margin 88 of pan 86 clears the uppermost leg portion of the side of beef to facilitate removal of the hook from the meat.

As soon as frame 14 has been moved upwardly a sufficient distance to permit the hook to be readily removed from the leg of the beef side, the operator releases switch arm 136 of switch 128 to stop rotation of motor 120 and thereby pump 110. The liquid is retained within respective tubular members 48 because normally closed valve 116 prevents liquid from returning from members 48 through by-pass line 114. It is to be noted that if the operator should inadvertently leave switch arm 136 depressed into contact with posts 124 for an extra period of time, switch 140 prevents frame 14 from moving upwardly with respect to frame 12 further than a predetermined set distance, determined by the location of stop arm 150 disposed on one of the tubular members 50. It can be recognized that as stop arm 150 moves upwardly into engagement with arm 148 on switch 140, switch arm 138 is moved away from contact 143 against the action of spring 152 normally biasing switch arm 138 into engagement with contact 143. Movement of switch arm 138 away from contact 143 breaks the circuit to motor 120 and causes the same to stop immediately, whereupon pumping of liquid into tubular members 48 is stopped.

The operator of truck 10 may then lower frame 14 for transportation purposes by depressing switch arm 132 of switch 126 to energize solenoid 118 through a circuit from battery 122 traced by lead 130, contact posts 124 of switch 126, switch arm 132, and lead 134 connected directly to solenoid 118. Again it is to be noted that solenoid 118 as well as battery 122 are grounded to base 20 by leads 146. Upon actuation of solenoid 118, valve 116 is opened to permit liquid to flow from tubular members 48 through laterals 106 and into by-pass 114 for passage to reservoir 102. Manifestly, the weight of frame 14 and particularly of the side of beef disposed in receptacle 84 causes the liquid to flow from tubular members 48 at a relatively fast rate so that frame 14 descends to the lowermost end of its path of travel in a short period of time. It can also be seen that downward movement of frame 14 may be interrupted at any point by merely releasing switch arm 132 of switch 126 to deactivate solenoid 118 and effect immediate closing of valve 116.

The receptacle 84 mounted on frame 14 may be readily removed for cleaning purposes by merely shifting the same upwardly with respect to frame 14 and thereby moving collars 92 upwardly off of tubular members 50.

It can now be appreciated that hand truck 10 is particularly efficient in operation because of the hydraulic mechanism for raising and lowering frame 14 in a minimum amount of time, and the fact that the center of gravity of the side of beef carried within receptacle 84 may be lowered to a relatively low point so that movement of truck 10 may be effected with a minimum amount of effort. Furthermore, the hydraulic mechanism actuated by structure carried entirely by base 20 of truck 10 permits the operator thereof to raise and lower sides of beef or other articles without any manual effort whatsoever being necessary.

Having thus described the invention what is claimed as new and desired to be secured by Letters Patent is:

1. In a hand truck, a primary mobile frame provided with a pair of elongated, normally upright, parallel, horizontally spaced first tubular members open at the uppermost ends thereof; a secondary, U-shaped, article-supporting frame including a pair of elongated, parallel, horizontally spaced, second tubular members telescoped over and relatively shiftable with respect to corresponding first tubular members, the normally uppermost ends of the second members being closed and a crossbar interconnecting the lowermost extremities of said second members; an elongated element disposed within each pair of telescoped members and provided with a piston head on the normally lowermost end thereof within a corresponding first member and the normally uppermost end of the element having a thrust component engageable with said closed ends of respective second members; selectively actuatable hydraulic mechanism carried by the primary frame and operably coupled with the first members for directing liquid under pressure into said first members and against corresponding piston heads for shifting the elements and thereby respective second members and the secondary frame relative to the first members and said primary frame upon actuation of said mechanism an elongated, article-receiving receptacle; a pair of horizontally spaced collars connected to said receptacle and slidably disposed on corresponding second members of the secondary frame; and block means on the lowermost end of said receptacle engageable with and resting on said crossbar.

2. A hand truck as set forth in claim 1 wherein the lower edges of said block means are arcuate in configuration to prevent lateral movement of the lowermost end of the receptacle when said block means are resting on said crossbar.

3. A hand truck as set forth in claim 1 wherein said receptacle is substantially J-shaped transversely thereof from the front to the rear adapting the same to receive articles in the nature of sides of meat.

4. A hand truck as set forth in claim 3 wherein the normally uppermost edge of said receptacle is concave in configuration to clear the leg portion of a side of meat disposed in the receptacle to thereby permit a hook to be readily inserted into such leg portion.

References Cited in the file of this patent

UNITED STATES PATENTS

| | | |
|---|---|---|
| 2,175,041 | Thumin | Oct. 3, 1939 |
| 2,619,195 | Scott | Nov. 25, 1952 |
| 2,658,610 | Winslow | Nov. 10, 1953 |
| 2,738,086 | Reich | Mar. 13, 1956 |
| 2,743,833 | Peterson | May 1, 1956 |
| 2,762,518 | Streb | Sept. 16, 1956 |
| 2,832,435 | Garapolo | Apr. 29, 1958 |